July 18, 1967

T. C. BOUR 3,331,673

METHOD AND APPARATUS FOR IMPROVING
HOMOGENEITY OF VISCOUS LIQUIDS

Filed Sept. 23, 1964

INVENTOR.
THOMAS C. BOUR
BY
Chisholm and Spencer
ATTORNEYS

INVENTOR.
THOMAS C. BOUR
BY
ATTORNEYS

July 18, 1967

T. C. BOUR 3,331,673

METHOD AND APPARATUS FOR IMPROVING HOMOGENEITY OF VISCOUS LIQUIDS

Filed Sept. 23, 1964

INVENTOR.
THOMAS C. BOUR
BY Chisholm and Spencer
ATTORNEYS

July 18, 1967

T. C. BOUR 3,331,673

METHOD AND APPARATUS FOR IMPROVING
HOMOGENEITY OF VISCOUS LIQUIDS

Filed Sept. 23, 1964

INVENTOR.
THOMAS C. BOUR
BY Chisholm and Spencer
ATTORNEYS

United States Patent Office 3,331,673
Patented July 18, 1967

3,331,673
METHOD AND APPARATUS FOR IMPROVING HOMOGENEITY OF VISCOUS LIQUIDS
Thomas C. Bour, Allison Park, Pa., assignor to Pittsburgh Plate Glass Company, Pittsburgh, Pa., a corporation of Pennsylvania
Filed Sept. 23, 1964, Ser. No. 400,973
10 Claims. (Cl. 65—130)

ABSTRACT OF THE DISCLOSURE

Homogenizing a viscous liquid by causing it to fall in a stream from a point of origin into a pool of the liquid and maintaining the length of fall of the liquid stream, the viscosity of the liquid and the rate of flow from the point of origin of the stream so as to cause the viscous liquid to be deposited on the surface of the pool in a spiral pattern.

---

The present invention relates to a method and apparatus for homogenizing a viscous liquid. More particularly, the invention relates to a method and apparatus for homogenizing a viscous liquid without the aid of mechanical stirrers or intricate flow channels. In certain embodiments of the invention, the flow rate of the viscous liquid material through the apparatus is also automatically regulated.

In the melting of highly viscous materials such as molten glass, non-homogeneous bodies of the highly viscous material circulate without adequate mixing in the greater mass of the viscous material. These non-homogeneous bodies, in the case of glass, result typically from the presence of refractory stones, unmelted glass batch particles, or cord masses in the molten glass. These non-homogeneous bodies of the glass melt differ in composition and produce highly inhomogeneous glass. This results in variable characteristics in different portions of the articles produced from such glass.

The fabrication of optical glass articles, for example, requires glass of very high homogeneity. The high degree of homogeneity is usually attained by a mechanical mixing apparatus, such as a stirrer. The typical mixing apparatus is normally installed somewhere between the refining zone of the optical glass tank and the final molding stage of the optical glass operation. A mechanical mixing apparatus, such as a stirrer, is expensive to fabricate and operate because of the viscous nature of molten glass.

The final quality of many other glass products depends, to a great extent, on the homogeneity of the glass used to produce those products. The glass fibers or filaments used in the manufacture of textiles and reinforced plastics must be of substantially uniform size and characteristics to produce commercially acceptable products. To develop the necessary uniform size and characteristics of the glass fibers requires that the glass or mineral material employed be highly refined and of good homogeneous quality. This is especially important in the manufacture of textile glass fibers where the trend is toward the manufacture of finer and finer individual fibers in the yarn.

In the formation of glass fibers, it has been the practice to prepare relatively large quantities of glass by melting raw batch materials in a premelting operation and then mold this premelted glass into the shape of small spheres or marbles. The raw materials are initially melted and fined until the glass is reasonably free of seeds, cords, stria and other impurities which would impair the quality of the final glass fibers. These spheres or marbles of glass are remelted to form the textile filaments or strands. The remelting represents an undesirable extra expense.

Various conventional fining techniques have been used in the relatively large tanks used to melt and refine the glass which is formed into marbles. Attempts have been made to homogenize the refined glass during its delivery to the marble making machine. One such homogenizing method is shown in U.S. 2,577,213. In this patent, the refined glass flows downwardly from an orifice in a forehearth in the form of an attenuated stream. The attenuation of the stream serves to attenuate cords and other non-uniformities in the glass and enhance their diffusion in the glass. According to the patent, the attenuated stream is forcibly folded back and forth upon itself in a path as it is deposited in another body of molten glass. This folding requires the use of auxiliary equipment which represents an additional expense for purchase and maintenance of the folding equipment. It also increases the space necessary for the manufacture of the glass.

It has been discovered in the present invention that by properly selecting the length of fall of a liquid stream of a particular viscosity and rate of flow that the drawn out distribution of inhomogeneities can be maintained and diffusion of the inhomogeneity enhanced upon deposition of the stream in another body of molten glass. This is accomplished in the present invention by causing the viscous liquid to be deposited on the surface of a pool of viscous liquid in a spiral pattern. The creation of the spiral pattern of stream deposition occurs automatically as the result of the natural characteristics of the free falling viscous liquid stream. No overt steps must be taken or extra apparatus employed to start or maintain the desirable spiral pattern of deposition.

The mechanism of homogenization in the present invention is theorized to be in accord with the following description. During the time of free fall the viscous liquid stream becomes attenuated due to the combined effects of the force of gravity and the surface tension of the viscous liquid. To maintain a continuous flow of the viscous liquid stream as the stream velocity increases, requires that the cross section of the stream simultaneously decrease which results in developing a greater surface area per unit volume in the viscous liquid stream. The stream is able to retain its relatively high surface to volume ratio by depositing itself in a spiral pattern on the surface of a pool of viscous liquid in a collecting container. The maintained, increased ratio of surface area to volume, even after penetration of the liquid stream below the surface of the pool of viscous liquid, permits the maintenance of a more thorough diffusion of the inhomogeneities in the viscous liquid pool within the collecting container.

The homogenization of viscous liquids is difficult because viscous liquids characteristically exhibit laminar flow. Laminar flow is defined as flow in which the fluid moves in layers, or laminas, one layer of the fluid gliding smoothly over an adjacent layer with only a molecular interchange of momentum. Any tendency toward instability or turbulence is damped out by viscous shear forces in the fluid which resist relative motion of adjacent fluid layers. Low viscosity liquids exhibit turbulent flow characteristics making mixing and homogenization easier. The very erratic motion of fluid particles in turbulent flow permits violent transverse interchange of momentum in the fluid allowing for easy homogenization.

The present invention is applicable to the homogenization of viscous liquids which, due to their high viscosities, cannot achieve turbulent flow in normal applications. Whether a particular flow is laminar or turbulent can be determined by the value of the Reynolds number which is a well known dimensionless ratio of fluid properties. The Reynolds number is defined as $PVD/\mu$, where $P$ is the fluid density, $V$ is the average fluid velocity, $D$ is a dimension of the flow stream (diameter in the case of a circular flow stream), and $\mu$, the fluid viscosity. When the Reyonds number is less than 2,000 the type of fluid flow is always laminar.

The present invention can be used to homogenize viscous liquids exhibiting a Reynolds number less than 2,000, but is particularly useful when the Reynolds number is between 0.001 and 10.0. Typical of the viscous liquids exhibiting laminar flow is molten glass, the Reyonds number of which is always less than 2,000, and in most cases, less than 1.0.

The variables which must be controlled to practice the present invention are the viscosity of the liquid in an upper and lower container, the size, length and number of orifices through which the liquid material flows, the rate of fluid flow, the height of free fall of the viscous liquid before it contacts the surface of the viscous liquid in the lower container, the net pressure at the orifices and the pressures in various parts of the homogenizing apparatus due to different liquid levels in various parts of the apparatus being used.

Not just any combination of these variables will produce the spiral mixing pattern which results in increased homogeneity of the liquid. If the distance through which the viscous liquid is allowed to fall is relatively short for a given viscosity and rate of flow, the attenuated stream of viscous liquid penetrates deeply into the lower container with no spiral deposition on the surface and little or no mixing. As the distance the viscous fluid falls is increased, more spiral deposition and diffusion results. Too great a free fall distance, on the other hand, for a liquid of given viscosity and rate of fluid flow results in overlapping of the viscous material on the liquid surface as contact is made in the lower container causing the entrapment of undesirable bubbles in the liquid.

In certain of the embodiments of the present invention, the liquid level in the lower container and the rate of flow of the viscous liquid to the lower container can be automatically controlled. This is accomplished by enclosing the space through which the stream falls between the containers with a skirt or wall that extends beneath the surface of the liquid in the lower container. The enclosed space varies in volume and pressure as the liquid level in the lower container changes and this affects the net pressure at the outlet orifice of the upper container. Higher gaseous pressure decreases the flow rate through the orifice or orifices while lower gaseous pressure increases the flow rate. This is a self-regulating system which serves to maintain substantially constant flow rate and liquid level.

The invention and its various embodiments are further described below in conjunction with a description of the figures in the drawings in which.

The invention will be further understood by reference to the following examples in connection with the drawings.

EXAMPLE I

Figures 1, 2, 3:
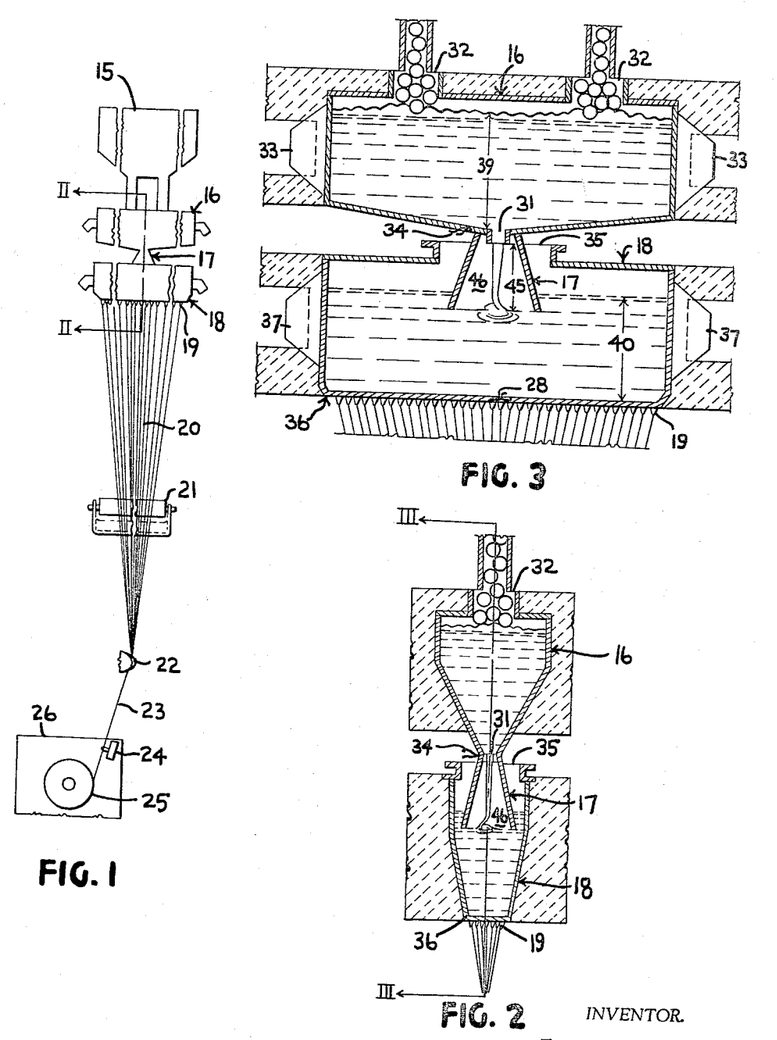
FIGURE 1 is an elevation of the present invention showing the relationships that exist between the premelter, skirt and bushing and the other components of a typical fiber glass forming apparatus in which marbles of a fiber glass composition are melted, homogenized and formed into fiber glass filaments.
FIGURE 2 is a sectional view of the apparatus shown in FIGURE 1 taken along line II—II of FIGURE 1.
FIGURE 3 is a sectional view of the apparatus shown in FIGURE 1 taken along line III—III of FIGURE 2.

In FIGURE 1 is shown a typical fiber glass forming apparatus. The principal component parts of FIGURE 1 are a source of glass marbles 15, a premelter 16, a skirt 17, a bushing 18, bushing tips 19, drawn fibers 20, a size applicator 21, a guide 22, to gather the individual fibers into a strand 23, a traverse mechanism 24, a forming tube 25, driven by a winder mechanism 26.

Glass marbles of a suitable fiber glass composition are introduced into the premelter 16, from a glass marble source 15, to be melted. As the glass marbles are melted in the premelter, the molten glass passes through a skirt 17, and down into the bushing 18. In the bushing, the temperature of the molten glass is adjusted to develop the proper glass viscosity to draw glass filaments. The molten glass is drawn through the bushing tips 19, to form glass filaments 20. The individual filaments are drawn over a size applicator 21, and collected in a guide 22, to form a strand 23. The fiber glass strand is passed through a traverse mechanism 24, which moves the strand back and forth as it is being wound on a forming tube 25, driven by a winder mechanism 26.

FIGURES 2 and 3 show the details of a portion of the fiber glass forming operation which can be used in practicing the teachings of the present invention. The particular portion of interest consists of the premelter 16, the skirt 17, and the bushing 18. This apparatus is used in the manufacture of glass fibers in which glass marbles or pellets are the batch material instead of raw oxide materials used in a direct melt furnace type of operation. The base glass composition of the glass marbles utilized in this example is known as the E glass composition and is as follows.

| Oxide component: | Percent by weight |
|---|---|
| $SiO_2$ | 54.4 |
| $Al_2O_3$ | 13.4 |
| $CaO$ | 21.7 |
| $MgO$ | 0.4 |
| $B_2O_3$ | 8.5 |
| $F_2$ | 0.2 |
| $Na_2O$ | 0.7 |
| $TiO_2$ | 0.5 |
| $Fe_2O_3$ | 0.2 |

The premelter portion of the apparatus 16, is fabricated from a 90 percent platinum-10 percent rhodium alloy into the configuration shown in FIGURES 2 and 3. The premelter is 12 inches long and 4 inches wide at the top. The lower portion of the premelter is tapered to fit the upper portion of the skirt 17. In the lower portion of the premelter where connection to the skirt is made, a single orifice 0.254 inch in diameter and 0.040 inch in length is located and is identified at 31. In the top of the premelter are two circular feed holes 32, through which the marble glass pellets are introduced into the premelter using a gravity feed mechanism. The size of the feed holes through which the marbles are introduced is 1⅛ inches in diameter. The premelter is provided with electrical contacts 33 at both of its ends and is heated by passing an electrical current throughout its configuration as in the manner of a resistance heater. Thermocouples 34 are attached at a point near the flow orifice of the premelter to measure and to provide means for automatically regulating the temperature within the premelter.

The skirt is fabricated in the form of a truncated regular pyramid 3 inches by 2 inches at the base and 1 inch by ½ inch at the apex. The skirt is also fabricated from a 90 percent platinum-10 percent rhodium alloy. The height of the skirt is 2¾ inches. The skirt is affixed to the premelter about the orifice in the base of the premelter. The positioning of the skirt with respect to the premelter and bushing can be seen in FIGURES 2 and 3.

The bushing portion 18 of the apparatus consists of a roughly rectangularly shaped chamber 35 having an opening in its top through which the base of the skirt may be introduced into the space in the interior of the bushing. The size of the opening in the top of the bushing is 3½ inches by 2½ inches. The base of the bushing 36, containing the bushing tips is 12 inches long by 2 inches wide. The bushing contained 800 bushing tips 19, arranged in 80 equally spaced rows of 10 tips each. The size of each individual bushing tip orifice is 0.046 inch in diameter and the length of each tip orifice is 0.150 inch. The bushing is provided with electrical contacts 37 at both ends.

The bushing is heated through resistance heating in the same manner as the premelter. The bushing and the premelter are electrically insulated from each other and are individually heated. The temperature of the bushing is measured and regulated by thermocouples located near the base of the bushing, at a point 28. There is no electrical connection between the skirt assembly and the bushing. The bushing is 12 inches long by 3 inches wide at the top and is tapered toward its bottom to join the base containing the bushing tips. The configuration of the bushing can be seen in FIGURES 2 and 3.

To make glass filaments utilizing the present apparatus, the premelter is filled to about ¾ of its total volume with glass marbles of the E glass composition. Electrical current is then passed through the premelter to heat the premelter and, in turn, to melt the glass marbles. The temperature of the premelter is raised to approximately 2300° F. As melting of the glass marbles begins additional glass marbles are introduced into the premelter by the gravity feed mechanism to maintain a level 39, of glass within the premelter of about 4 inches. As the glass marbles melt, a glass passes through the orifice 31, in the bottom of the premelter through the skirt 17, and into the bushing 18, where it is collected. The level of molten glass 40, in the bushing builds up. Electrical current is also applied to the bushing to keep the molten glass at the proper temperature and viscosity for fiber formation. After a period of time, the glass level 40, in the bushing increases to a point sufficient to trap air in the skirt. The trapped air chamber 46, is formed when the glass level in the bushing reaches about 3½ inches in height. The level continues to rise until the flow rate from the bushing equals the flow rate from the premelter. Glass fibers are then drawn from the bushing tips at a rate of about 10,000 feet per minute, producing an average filament diameter of about $18 \times 10^{-5}$ inches.

The electrical current is applied to the premelter to maintain a temperature in the premelter of about 2300° F., which develops a viscosity for the E glass composition of about 440 poises. The level of the glass 40, in the bushing, is maintained at about 4 inches, and the temperature of the bushing is maintained at about 2300° F., which develops a viscosity for the E glass composition of about 440 poises.

After a short period of time, equilibrium is established in which the rate of flow of molten glass through the orifice 31, in the base of the premelter equals the rate of glass draw through the bushing tips 19 of the bushing. At this equilibrium condition, the level of glass 39 in the premelter remains at approximately 4 inches. Approximately 630 marbles ¾ of an inch in diameter need to be introduced per hour to maintain this glass level in the premelter with a flow rate of 15 pounds per hour. At equilibrium, the level of the glass in the bushing 40, remains at about 4 inches.

At shut down, the apparatus requires stopping the gravity feed of the marbles into the premelter and reducing control temperature of premelter and bushing to approximately 1600° F.

To restart the operation requires increasing the temperature of the premelter and bushing to operating temperature, and simultaneously starting marble flow into the premelter. Neither the bushing nor the premelter need be drained before restarting.

At equilibrium conditions the height of fall 45, from the orifice in the base of the premelter through the skirt and onto the surface of the glass in the bushing is 2½ inches. The flow rate through the orifice for the E glass composition at 2300° F. is 15 pounds per hours at equilibrium, which equals the rate at which the glass is drawn from the bushing tips.

Control over the rate of flow through the orifice of the premelter is accomplished by regulating the following variables: the height of molten glass 39 in the premelter above the orifice 31, the level of glass in the busing 40, the temperature of the molten glass in the premelter, and the gas pressure in the chamber 46 within the skirt 17. The rate of glass flow through the orifice of the premelter depends upon the net pressure at the orifice and the viscosity of the molten glass flowing through the orifice. The net pressure at the orifice is the difference between the pressure exerted on the orifice by the level of the glass in the premelter 39, and the pressure of the gas in the chamber 46, within the skirt. The pressure in chamber 46 of the skirt in turn is dependent upon the height of the glass 40, in the bushing.

The flow of molten glass through the orifice is automatically regulated during the fiber forming operation in the following manner. As molten glass flows through the orifice and fills the bushing, the glass level 40, in the bushing 18, increases. The gas pressure in chamber 46 is thus increased which reduces the net pressure at the orifice 31, which decreases the molten glass flow rate through the orifice. As glass is drawn from the bushing tips 19, the glass level 40 of the bushing decreases. The gas pressure in chamber 46 decreases increasing the net pressure at the orifice 31, which causes a greater flow rate of molten glass through the orifice to refill the bushing.

EXAMPLE II

This example is the best mode contemplated by the inventor of carrying out his invention.

Figure 4:
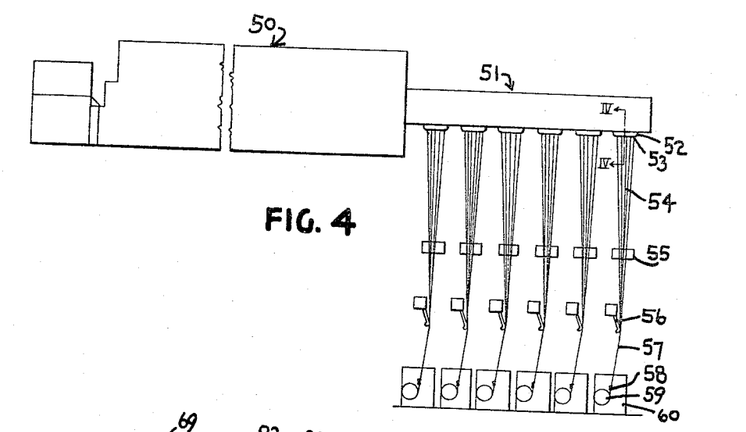
FIGURE 4 is a diagrammatic view illustrating apparatus which is used in the best mode contemplated by the inventor of carrying out the invention and which shows the forehearth of a direct melt furnace in which several homogenizer-bushing complexes are placed to homogenize and form fiber glass filaments.

FIGURE 4 is an elevation of the apparatus used to form glass fibers in a continuous direct melt process. Shown in FIGURE 4 is a glass melting tank 50, having a long narrow forehearth 51 extending from the refining end of the tank. In successive positions along the length of the forehearth there are mounted a plurality of homogenizer and electrically heated bushing complexes 52, bushing tips 53 at the base of each bushing, glass filaments 54 drawn from each bushing, and a size applicator 55, a guide 56 to gather the individual fibers into a strand 57, a traverse mechanism 58, a forming tube 59, and a winder mechanism 60 to drive the forming tube for each of the homogenizer and bushing complexes.

The batch is melted in the tank 50 by radiant heat from conventional gas burners, and the molten glass flows by gravity into the forehearth 51. The molten glass flows through the homogenizer and bushing complexes 52, and then through the bushing tips 53 to form glass filaments 54. The individual filaments are drawn over a size applicator 55, and collected by a guide 56 to form a strand 57. The strand is passed through a traverse mechanism 58, which moves the strand back and forth as it is being wound on a forming tube 59, driven by the winder mechanism 60.

Figure 5:
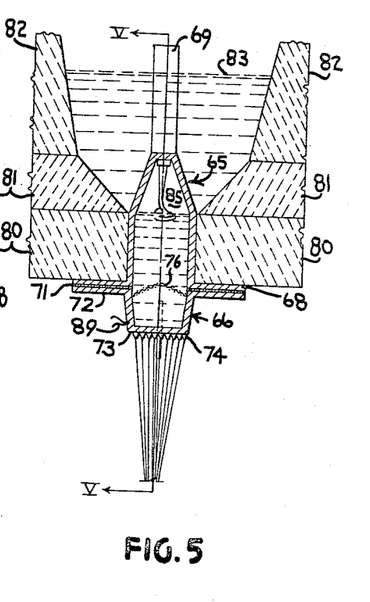
FIGURE 5 is a sectional view of the apparatus shown in FIGURE 4 taken along line IV—IV of FIGURE 4, illustrating a homogenizer and bushing used to form fiber glass filaments in a direct glass melt type of operation.
Figure 6:
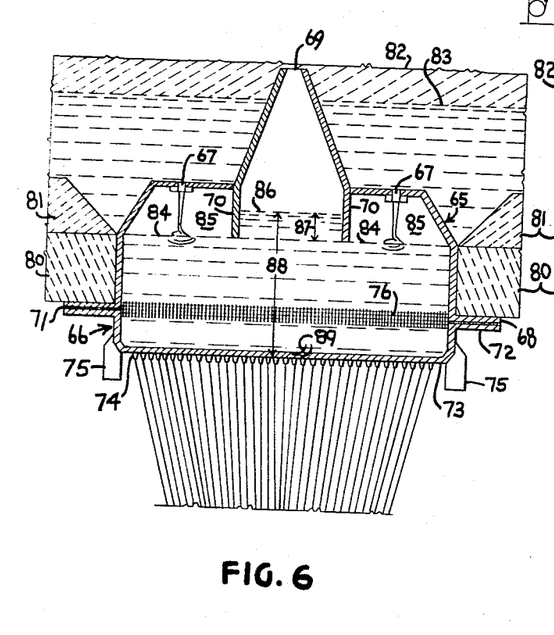
FIGURE 6 is a sectional view of the apparatus shown in FIGURE 4 taken along line V—V of FIGURE 5.

FIGURES 5 and 6 show the portions of the fiber glass forming apparatus of interest in practicing the teachings of the present invention.

Figure 7:
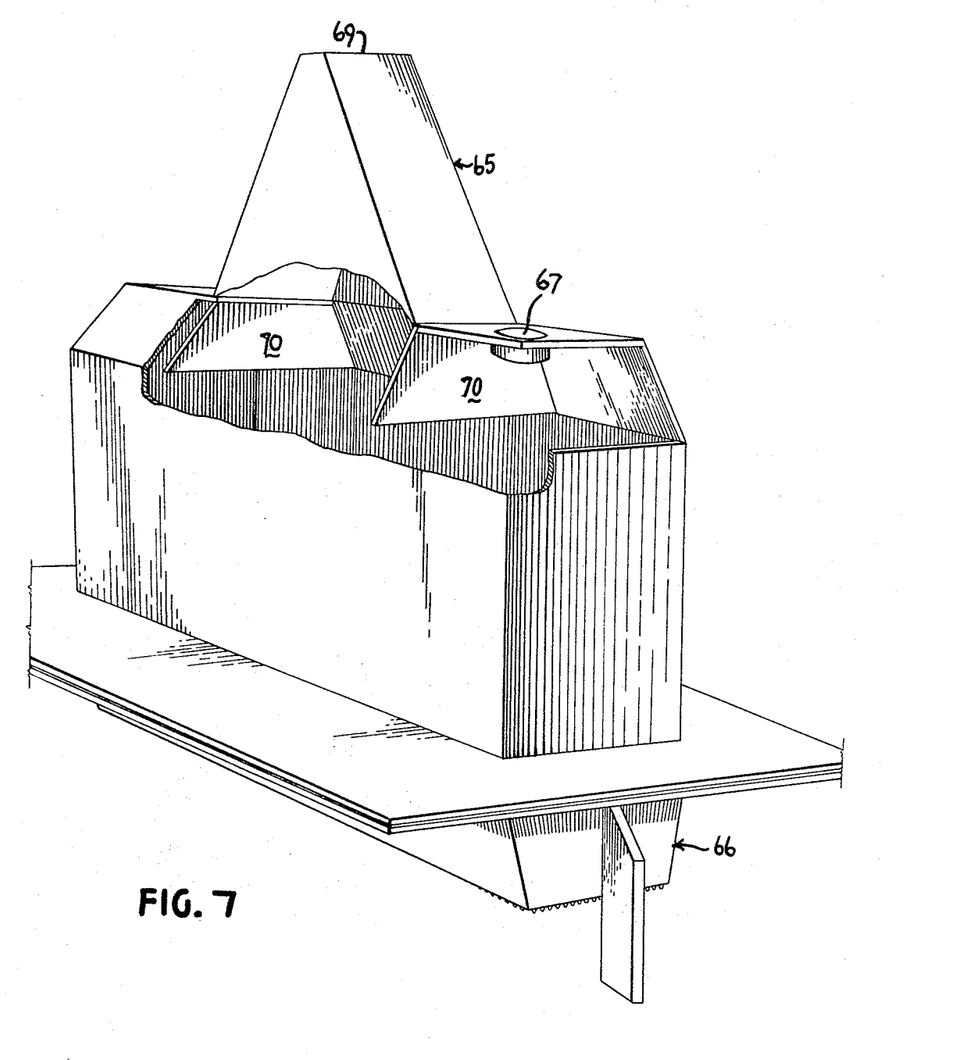
FIGURE 7 is a pictorial view of the homogenizer and bushing apparatus shown in FIGURE 6 with a portion cut away to reveal the internal detail.

FIGURES 5 and 6 show the detail of the homogenizer 65 and the detail of the bushing 66 through which the glass fibers or filaments are drawn. The overall dimensions of the homogenizer are 16 inches long by 4 inches wide at the flange 68 and 7 inches high including the vent 69. The homogenizer is fabricated from a 90 percent platinum-10 percent rhodium alloy into three horizontally oriented chambers. The center chamber is the chamber vented to the atmosphere of the forehearth furnace and the outer two chambers each have an orifice in their uppermost portions 67. The internal detail of the construction of the three horizontally oriented chambers of the homogenizer is shown in the cut away drawing, FIGURE 7. The orifice in each of the two outermost chambers is 0.231 inch in diameter and 0.040 inch long. The vent opening to the atmosphere of the forehearth is ¾ of an inch by ¾ of an inch square. The partitions 70, which separate the internal volume of the homogenizer into three distinct chambers are 2 inches high by 1⅝ inches wide at the widest point and 0.040 inch thick.

The opening in the base of the homogenizer is 11¾ inches long by 1⅝ inches wide, which is surrounded by the flange 68, which is 16 inches long by 4 inches wide and 0.015 inch thick.

Between the homogenizer and the bushing is an alumina-silica ceramic fiber gasket 71, whose overall dimensions are 4 inches wide and 16 inches long. The gasket contains a rectangular hole 1¾ inches wide and 12 inches long. The gasket is ⅛ of an inch thick before compression. The gasket provides electrical insulation between the bushing and the homogenizer. The homogenizer is not provided with any electrical heating means.

The bushing portion of the apparatus 66 consists roughly of a rectangular shaped container having an opening in its top 12 inches long by 1¾ inches wide through which the molten glass from the homogenizer passes into the interior of the bushing. The bushing tip plate 73 supports the 800 bushing tips 74. The bushing tips are arranged in 80 equally spaced rows of 10 tips each. The size of each individual bushing tip orifice is 0.046 inch in diameter and 0.15 inch in length. The bushing is provided with electrical contacts 75 at each end. The bushing is heated by passing an electrical current throughout the bushing configuration in the manner of a resistance heater. A screen 76 is placed in the bushing near its uppermost portion. The screen extends the entire length and width of the opening leading into the bushing. The size of the holes in the screen are 0.055 inch in diameter and occur 100 holes to the square inch. The screen is 0.020 inch thick. The sides of the bushing are tapered toward its bottom to join the bushing tip plate which is 12 inches long by 1⅜ inches wide.

In FIGURES 5 and 6 the refractory bushing block 80, the refractory flow block 81, and the sidewall refractory block 82, are parts of the forehearth refractory structure of the direct melt glass furnace. The surface level of the molten glass in the forehearth is indicated as 83 and determines pressure above the orifices 67. The surface level of the molten glass in the homogenizer after the molten glass has flowed through each orifice 67 and has collected in the homogenizer is indicated as 84. The outermost chambers formed by the configuration of the homogenizer and the level of the molten glass in the various parts of the homogenizer and the level of the molten glass in the various parts of the homogenizer are indicated as 85. The surface level of the molten glass in the chamber vented to the forehearth atmosphere is indicated as 86. The level of the molten glass in the vented chamber of the homogenizer above the level of the molten glass at the bottom of the two outermost chambers 85 is indicated as 87. The head of glass causing flow through the bushing tips is indicated as 88. The temperature of the bushing is measured and controlled by a thermocouple 89 located near the center of the bushing tip plate.

In the operation of the apparatus shown in FIGURES 5 and 6, molten glass from the forehearth flows through each orifice 67, down through chamber 85 and onto the glass surface level 84. The glass flows through each orifice due to the pressure exerted by the glass level in the forehearth 83. As the bushing and homogenizer fill with molten glass the pressure due to the level of molten glass 87 increases. The increase in glass level 86 causes the gas pressure of chamber 85 to also increase. The increase of gas pressure in chamber 85 automatically decreases the flow of the molten glass through orifice 67 into the homogenizer and bushing.

Once the operation is begun glass constantly flows through the orifices 67 of the homogenizer down through the screen and into the bushing. Glass is also constantly being drawn off through the bushing tips 74. If the amount of glass in the homogenizer decreases, the pressure due to the glass level 87 decreases, which in turn decreases the gas pressure in chamber 85. This allows an increased amount of glass to flow through each orifice 67. If the amount of glass in the homogenizer increases, the pressure due to the glass level 86 increases, which in turn increases the gas pressure of chamber 85. This tends to decrease the total amount of glass which flows through each orifice 67. This mechanism develops a continuous self-regulating glass delivery and homogenizing operation.

If flow of glass through the bushing tip 74 is stopped, the level of the molten glass indicated by 86 in the homogenizer continues to increase in the chamber vented to the forehearth atmosphere until the glass level 86 in the vented chamber equals the glass level 83 present in the forehearth. Once this equalization of glass levels occurs, the net pressure at the orifices 67, through which the molten glass flows into the homogenizer, is zero, and the flow of molten glass through the orifices ceases.

To restart the operation requires only that the glass flow through the bushing tips be restarted. Flow of glass through the bushing tips causes the level of the molten glass in the vented portion of the homogenizer, indicated by glass level 86, to decrease, which in turn decreases the gas pressure of chamber 85. The net pressure then at each of the orifices of the homogenizer is now not zero and glass flow begins through the orifice to replenish the glass supply in the homogenizer and the bushing.

If a contant rate of glass is drawn to form filaments an equilibrium condition is soon established in the homogenizer and bushing complex in which the total amount of glass flowing through the orifices of the homogenizer equals the amount of glass being drawn through the bushing tips.

There is no significant difference between the apparatus used in conjunction with a direct melting type of glass furnace and the apparatus used in which glass marbles are the raw batch material except in the details of the design. The mechanisms and principles of homogenization and control of the flow rate through the orifices forming the homogenizing streams of the two types of apparatus are identical.

It has been observed that the apparatus of Example II produces a greater amount of useable homogeneous glass filaments than was previously possible using older types of fiber glass forming apparatus. In controlled comparative runs using an E glass composition a conventional glass filament forming operation produced 7.2 pounds of glass filaments per bushing hour as a weekly average. The preferred apparatus of Example II produced 11.1 pounds of glass filaments per bushing hour as a weekly average. In both runs using the E glass composition the bushings were identical. The bushings each contained 800 filaments and the glass filaments produced in both runs were $18 \times 10^{-5}$ inches in diameter.

The increased homogenization of the present apparatus increased the overall efficiency of the operation permitting the production of a greater volume of useful glass filaments in the same length of time.

EXAMPLE III

Figure 8:
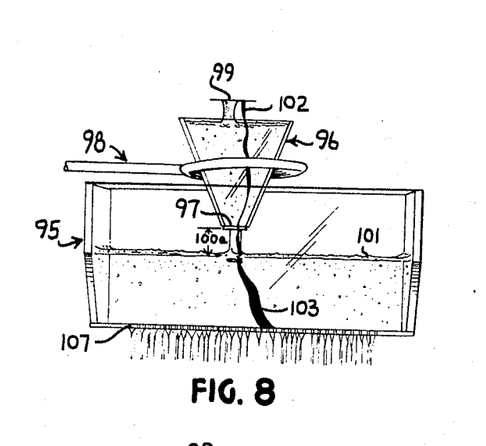
FIGURE 8 is a front elevation of an apparatus used to homogenize a viscous organic liquid. The extent of homogenization produced by a ¾-inch separation distance is indicated by the amount of dye diffusion produced in the lower container.

To further demonstrate the principles and degree of homogenization that can be produced by the practice of the present invention, the apapratus shown in FIGURE 8 was devised. The apparatus of FIGURE 8 was fabricated from ¼ inch thick sheets of polymethyl methacrylate (Plexiglas). The apparatus consisted of two containers. The larger of the two containers 95, roughly conformed to the shape of a rectangular box approximating the overall shape of the homogenizer and bushing complex discussed in Example II. The larger Plexiglas container was 12 inches long by 3 inches wide at the top and was tapered toward its bottom to a shape 12 inches long by 1 inch wide. The top of the box was left open and the bottom surface of the box was perforated with a multiplicity of small orifices 107 which simulated the bushing tips of the bushing in a fiber glass forming apparatus. There were 100 orifices arranged in 25 rows of 4 each. Each orifice was 0.089 inch in diameter and 0.125 inch long.

The smaller of the two Plexiglas containers 96, was fabricated in the form of a regular truncated prism having a square horizontal cross section 4 inches by 4 inches at the base 1 inch by 1 inch at the apex. A circular orifice 0.359 inch in diameter and 0.250 inch long was drilled in the apex of the truncated prism 97.

The apparatus was set up with the smaller container 96 supported above the larger container 95 by means of an adjustable support 98, as shown in FIGURE 8. The entire upper container and half of the lower container were then filled, from a source 99, with a mixture of polyisobutylene and mineral oil which had a viscosity at room temperature approximating the viscosity of the E glass composition used in Examples I and II at the typical fiber drawing temperature. The viscous liquid used to simulate the molten glass was prepared by mixing 25 parts of polyisobutylene and 75 parts of mineral oil. The viscosity of the mixture thus produced was approximately 160 poises at room temperature and the flow rate through the orifice 97, was about 10.5 pounds per hour.

In FIGURE 8 the model was set up to have a separation distance of ¾ of an inch indicated as 100a, between the orifice 97, in the apex of the upper container and the surface of the viscous material in the lower container 101. What appears to be a black line 102, running from the top of the upper container through to the bottom of the upper container then through the column of viscous material flowing through the orifice down and through the central interior portion of the viscous material to the base of the lower container, is a dye representing a cord type of inhomogeneity contained in the viscous liquid. FIGURE 8 clearly indicates how the cord type of inhomogeneity contained in the viscous material flows through the entire apparatus and out through the holes in the base of the lower container with very little dispersion indicated as 103, indicating that little homogenization of the viscous material has resulted from passing through the apparatus.

Figure 9:
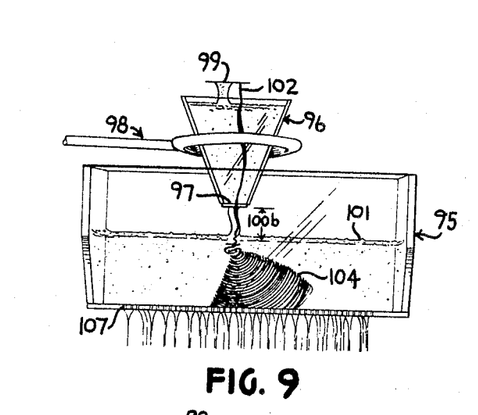
FIGURE 9 is a front elevation of the same apparatus of FIGURE 8 indicating the effect on the degree of homogenization produced by increasing the separation distance to 1 inch.
Figure 10:
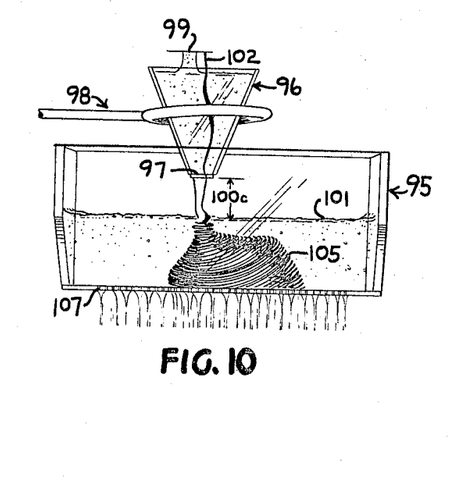
FIGURE 10 is a front elevation of the same apparatus of FIGURE 8 indicating the further increase in homogenization produced by increasing the separation distance to 1½ inches.
Figure 11:
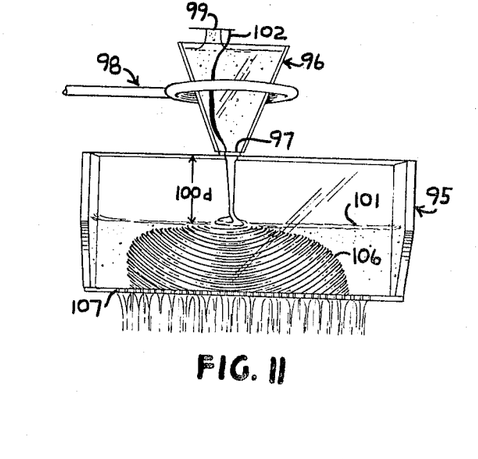
FIGURE 11 is a front elevation of the same apparatus of FIGURE 8 indicating the optimum separation distance of 2½ inches determined for the viscous organic liquid used, which results in good homogenization without the introduction of unwanted bubbles.

FIGURE 9 demonstrates the increase in the amount of dye dispersion 104, that ocurs when the height of the fall 100b, of the viscous liquid stream is increased to 1 inch indicating that homogenization has been increased. FIGURE 10 indicates the further increase in the amount of homogenization 105, that occurs when the height of fall 100c, is increased to 1½ inches. Finally, FIGURE 11 indicates the optimum height of fall 100d for the liquid stream at the viscosity and rate of fluid flow selected through the orifice used, and the excellent degree of homogenization 106 achieved. Further increase in the height of the viscous stream fall much above the optimum height of fall shown in FIGURE 11 results in overlapping of the viscous liquid upon itself as contact is made between the falling stream and the surface of the viscous liquid in the lower container, entrapping bubbles and thus introducing new inhomogeneities into the viscous material.

Example III indicates that the teachings of the present invention are applicable to the homogenization of organic, as well as inorganic liquids and that the techniques can be practiced at room temperature as well as at elevated temperatures.

An empirical formula has been devised which relates the significant variables of the present invention in terms of a dimensionless number which greatly simplifies the understanding of the invention. The formula is as follows:

$$N_m = \frac{P \times L^{4.0}}{1.02 \times 10^{-3} \mu \times Q}$$

where $N_m$ is a unitless number descriptive of the effectiveness of homogenization, P is the density of the viscous liquid in grams per cubic centimeter, L is the distance in centimeters of free fall of the viscous liquid stream from the orifice to the surface of a pool of viscous liquid, $\mu$ is the viscosity of the viscous liquid in poises $$\frac{(\text{dyne}-\text{sec.})}{\text{cm.}^2}$$

and Q is the volume flow rate of the viscous liquid through the orifice in cubic centimeters per second, and $1.02 \times 10^{-3}$ is a constant relating grams to dynes necessary to make $N_m$ a unitless number.

It has been determined that homogenization begins when the value of $N_m$ is 200. For most practical purposes, the useful range of $N_m$ is from 2,000 to 25,000. When the value of $N_m$ becomes greater than 25,000 the amount of bubble entrapment due to the overlapping of the viscous liquid stream upon itself becomes objectionable.

The range of viscosities of the viscous liquid which can be homogenized according to the teachings of the present invention is between 1 and 3,000 poises. Better homogenization is possible if the viscosity is between 30 and 3,000 poises and in the case of glass homogenization the preferable range of viscosity is normally between 100 and 1,000 poises. The viscosity range, in the case of glass, of 100 to 1,000 poises corresponds roughly to a temperature range between 2200° and 2500° F. for the typical fiber glass composition.

In desiging an apparatus to be used for homogenizing a viscous liquid between 1.0 and 3,000 poises in viscosity the distance of fall of the viscous stream can range from ½ of an inch to 12 inches depending upon the rate of flow through the orifice. Most frequently the operating limits in the present invention using a material having a viscosity corresponding to that of molten E glass are between 2 and 4 inches with an optimum height of fall of about 2½ inches.

To calculate the proper orifice size in designing a homogenizing apparatus used to homogenize glass, the following empirical formula has been determined which is applicable over a range of $l/D$ ratios of from 0 to 4.0:

$$QA = \frac{1.081 \times 10^3 \times D^{3.6} \times \Delta_p(\rho^2)}{l^{0.6}\mu}$$

where $l$ is the length of the orifice in centimeters; D, the diameter of the circular orifice in centimeters; $\Delta p$, the pressure head of the viscous fluid in centimeters of viscous liquid above the orifice; $\rho$, the density of the viscous liquid in grams per cubic centimeter; $\mu$, the viscosity in poises; QA, the flow rate in grams per minute and $1.081 \times 10^3$ is a constant to give QA the proper units.

This formula is useful when the glass viscosity, the orifice length and the hydrostatic pressure above the orifice are known and when the flow rate necessary to supply the bushing is assumed. The value given to QA is always somewhat greater than that required by the bushing. If the bushing is to deliver 15 pounds of glass per hour to make a desired strand, the orifice is designed to deliver approximately 20 pounds of glass per hour with atmospheric pressure in the flow chamber. If more than one orifice is used in the design, QA is first divided by the number of orifices to be used before solving for D.

The number, within limits, (1–100), of the orifices used is not critical. One can design a single orifice device or a multiple orifice device provided that the viscosity and height of fall are selected to match the size of the orifice or orifices selected. The shape of the orifice is also not of great significance since the falling stream will tend to develop a circular cross section as it falls due to the combined effects of gravity and surface tension.

The variables which determine the proper height of fall of the viscous liquid stream to develop good homogenization but not bubble entrapment are viscosity of the liquid flow stream, the orifice size and the flow rate of the viscous liquid. These variables determine the deposition rate in rotations per minute (r.p.m.) of the viscous liquid stream in the spiral pattern characteristic of the invention.

It has been noted in the present invention that the greater the height of fall of the viscous stream for a given rate of flow and viscosity, the faster becomes the rate of spiral stream deposition on the surface of the receiving pool of viscous liquid. The rate of spiral deposition for a liquid having a viscosity of 54 poises, a density of 0.89 gram per cubic centimeter, a flow rate of 17.3 pounds per hour and height of fall of 1.0 inch was measured to be 95 rotations per minute (r.p.m.). Changing only the height of fall for this liquid to 2 inches was found to produce a spiral deposition rate of 490 r.p.m. A further increase in the height of fall to 4 inches resulted in a 1700 r.p.m. deposition rate.

The deposition rate (r.p.m.), the viscosity and flow rate of the liquid being deposited and the viscosity of the liquid upon which the viscous stream is being deposited determine whether or not bubble entrapment will be produced. An increase in the viscosity of the liquid in the deposition pool also tends to decrease the total amount of homogenization which can be achieved.

An increased deposition rate tends to increase the degree of homogenization but too high a deposition rate tends to also cause bubble entrapment. These variables are controlled within the useful range of the present invention if the mixing number $N_m$ is between 2,000 and 25,000 and if the viscosities of the liquids in the stream and in the deposition pool are approximately equal.

The flow rate of the viscous liquid through the orifice is dependent, of course, on the size of the orifice, but in addition the flow rate depends upon the pressure exerted by the height of the pool of viscous liquid above the orifice. More specifically, the flow rate depends upon the net pressure at the orifice which is the difference between the pressure due to the height of the viscous liquid and the gaseous pressure within the flow chamber. The greater the difference in these two pressures the greater will be the flow rate through the orifice. The length of the orifice also affects the rate of viscous liquid flow. The extent of this variable on the flow rate is that the flow rate is inversely proportional to the length of the orifice to the 0.6 power, for orifice $l/D$ ratios less than 4.0.

For a given operating static condition where a fixed fluid viscosity is used, a fixed height of stream fall, a fixed orifice size, a fixed level of viscous liquid above the orifice and a fixed gas pressure in the gaseous space below the orifice through which the viscous stream flows, the flow rate through the orifice can still be regulated by varying the gas pressure over the surface of the pool of viscous liquid above the orifice.

The present invention eliminates the need for mechanical stirring mechanisms and premelting operations; however, it is still flexible enough to be used in conjunction with either of these methods if desired.

The homogenization produced in the present invention has been found to considerably increase the efficiency of fiber glass forming production. Controlled production runs using conventional equipment produced 7.2 pounds of useable fiber per bushing hour as a weekly average. The apparatus used in Example II of the present invention increased the production of useable fibers to 11.1 pounds per bushing hour as a weekly average.

The present invention, while adequate for many glass articles, may yet be inadequate in the production of glass articles requiring extremely homogeneous glass if only conducted once. The high degree of homogenization necessary for such special glass articles can still be attained by simply repeating the homogenizing operation several times on the same volume of glass.

The present invention is applicable to the homogenization of any viscous liquid regardless of its composition and can even be adapted to the blending or mixing of two viscous liquids of different composition.

The present invention is capable of homogenizing all types of glass compositions including those compositions used to manufacture containers, optical, ophthalmic and flat glass (made by float, plate or sheet process) articles.

The homogenization and the control of rate of flow of the viscous liquid through the orifice or orifices of the apparatus disclosed in the present invention are independent of bushing design and are unaffected by the number of tips from which the glass fibers or filaments are ultimately drawn.

There are numerous other ways to practice the invention which are easily devised once the relationships between the variables herein disclosed are understood.

While the present invention has been described with particular relation to specific examples, its scope should not be so limited. Various modifications may be made within the spirit and scope of the appended claims.

I claim:

1. A method of homogenizing a viscous liquid which comprises flowing said liquid from a point of origin to form a stream, flowing said stream through a gaseous space and depositing said stream on the surface of a pool of said liquid, the relationships between the density, the distance of flow, the viscosity and the volume flow rate of the liquid from the point of origin of the stream resulting in a $N_m$ number between 2,000 and 25,000 when calculated according to the formula $$N_m = \frac{P \times L^{4.0}}{1.02 \times 10^{-3} \mu \times Q}$$

where $N_m$ is a unitless number descriptive of the effectiveness of homogenization, P is the density of the viscous liquid in grams per cubic centimeter, L is the distance of flow in centimeters of the viscous liquid and the said distance of flow is between about one-half and about twelve inches, $\mu$ is the viscosity of the viscous liquid in poises and the viscosity of said liquid is between about 1 and about 3000 poises, and Q is the volume flow rate in centimeters to the third power per second of the viscous liquid from said point of origin of said stream, said volume flow rate of said viscous liquid is sufficient to deposit said stream in a spiral pattern.

2. A method of homogenizing molten glass which comprises flowing said molten glass from the point of origin to form a stream, flowing said stream through a gaseous space, and depositing said stream on the surface of a pool of molten glass, the relationships between the density, the distance of flow, the viscosity and the volume flow rate of the molten glass from the point of origin of the stream resulting in a $N_m$ number between 2,000 and 25,000 when calculated according to the formula $$N_m = \frac{P \times L^{4.0}}{1.02 \times 10^{-3} \mu \times Q}$$

where $N_m$ is a unitless number descriptive of the effectiveness of homogenization, P is the density of the molten glass in grams per cubic centimeter, L is the distance of flow in centimeters of the molten glass and the said distance of flow is between about one-half and about twelve inches, $\mu$ is the viscosity of the molten glass in poises and the viscosity of said molten glass is between about 1 and about 3000 poises, and Q is the volume flow rate in centimeters to the third power per second of the molten glass from the point of origin of said stream, said volume flow rate of said molten glass is sufficient to deposit said stream in a spiral pattern.

3. A method of homogenizing a viscous liquid having a viscosity between 1.0 and 3,000 poises which comprises flowing said liquid from a point of origin to form a stream, flowing said stream through an enclosed gaseous space, maintaining the distance of flow of said stream from its point of origin between about one-half and about twelve inches, maintaining the gaseous pressure in said enclosed gaseous space to maintain the rate of flow of said stream sufficient to deposit said stream on the surface of a pool of said liquid in a spiral pattern and within said space.

4. A method according to claim 3 in which the distance of flow of the stream through the enclosed gaseous space is between 2 and 4 inches and is insufficient to cause entrapment of bubbles in said liquid.

5. A method of homogenizing molten glass which comprises flowing molten glass having a viscosity between 1.0 and 3,000 poises from a point of origin to form a stream, flowing the molten glass stream through an enclosed gaseous space, maintaining the distance of flow of said stream from its point of origin between about one-half and about twelve inches, maintaining the gas pressure in said enclosed gaseous space to maintain the rate of glass flow therein sufficient to deposit the stream on the surface of a pool of molten glass in a spiral pattern.

6. An apparatus for homogenizing a viscous material comprising,
an upper chamber and a lower chamber positioned one above the other and separated by a gaseous space, each chamber containing viscous material,
the upper chamber having means therein defining an orifice through which the viscous material flows as a stream into the lower chamber and through the gaseous space,
the orifice means of the upper chamber and level of the viscous material in the lower chamber being spaced apart a distance such that said stream follows a spiral path onto the surface of the viscous material in the lower chamber.

7. An apparatus for homogenizing a viscous material comprising,
an upper chamber and a lower chamber positioned one above the other and separated by an enclosed gaseous space,
the chambers each containing a supply of viscous material and,
means defining an orifice in the upper chamber through which the viscous material flows as a stream through the enclosed gaseous space and into the lower chamber,
the orifice of the upper chamber and the level of the viscous material in the lower chamber being spaced apart a distance such that said stream follows a spiral path onto the surface of the viscous material in the lower chamber.

8. An apparatus for homogenizing a viscous material comprising,
an upper chamber and a lower chamber positioned one above the other and separated by an enclosed gaseous space, each chamber containing a supply of viscous material,
means defining an orifice in the upper chamber through which the viscous material flows as a stream through the enclosed gaseous space and into the lower chamber,
the orifice means of the upper chamber and the level of the viscous material in the lower chamber being spaced apart a distance such that said stream follows a spiral path onto the surface of the viscous material in the lower container,
and means to control the pressure of the gas in the enclosed gaseous space so as to control the rate of viscous material flow through the orifice of the upper chamber.

9. An apparatus for homogenizing molten glass prior to being drawn into fibers comprising,
a homogenizer and bushing,
a forehearth containing molten glass for supplying glass to said homogenizer,
means to divide the homogenizer into three horizontally oriented chambers,
means in the center chamber of the said homogenizer to equalize the pressure of the atmosphere therein and that in said forehearth,
and means in each of the other chambers defining an orifice in an upper portion thereof through which molten glass flows from said forehearth as a stream into the homogenizer,
said orifice means being spaced from the level of molten glass in the homogenizer such that the molten glass stream follows a spiral path onto the surface of the molten glass therein,
said bushing containing heating means and a plurality of orifices through which the molten glass flows to be formed into fibers.

10. An apparatus for homogenizing molten glass prior to being drawn into fibers comprising,
a glass premelter, in which glass is fed at a predetermined rate and is melted,
a heated bushing spaced from said premelter containing a supply of molten glass and having a plurality of orifices through which glass flows to be formed into fibers,
a skirt extending from said premelter toward and into said bushing and into the glass therein and in which a gas is trapped, the pressure of which is dependent upon the level of glass in said bushing,
and means defining an orifice in said premelter aligned with said skirt and opening thereinto through which molten glass flows as a stream into said bushing,
said bushing being open near its top to the ambient atmosphere so as to eliminate gas pressure build up therein upon a variance in glass level,
said premelter and bushing being spaced apart a distance such that said glass stream follows a spiral path onto the surface of the glass supply in said bushing.

References Cited

UNITED STATES PATENTS 2,577,213  12/1951  Slayter et al. _________ 65—134

S. LEON BASHORE, *Acting Primary Examiner.*

DONALL H. SYLVESTER, G. R. MYERS,
*Assistant Examiners.*

UNITED STATES PATENT OFFICE

CERTIFICATE OF CORRECTION

Patent No. 3,331,673                                        July 18, 1967

Thomas C. Bour

It is hereby certified that error appears in the above numbered patent requiring correction and that the said Letters Patent should read as corrected below.

Column 3, lines 2 and 8, for "Reyonds", each occurrence, read -- Reynolds --; column 5, line 55, strike out "a"; column 6, line 33, for "busing" read -- bushing --; column 8, lines 2 and 3, strike out "and the level of the molten glass in the various parts of the homogenizer"; column 9, line 17, for "apapratus" read -- apparatus --; line 37, after "base" insert -- and --; line 71, for "ocurs" read -- occurs --; column 12, line 70, for "the" read -- a --.

Signed and sealed this 22nd day of October 1968.

(SEAL)
Attest:

Edward M. Fletcher, Jr.                                        EDWARD J. BRENNER
Attesting Officer                                                    Commissioner of Patents